(12) United States Patent
Huntimer

(10) Patent No.: US 6,641,769 B1
(45) Date of Patent: Nov. 4, 2003

(54) METHOD OF FORMING COMPOSITE ULTRAHIGH MOLECULAR WEIGHT POLYETHYLENE MATERIAL

(75) Inventor: Todd Huntimer, Arlington, SD (US)

(73) Assignee: Global Polymer Industries, Inc., Arlington, SD (US)

( * ) Notice: Subject to any disclaimer, the term of this patent is extended or adjusted under 35 U.S.C. 154(b) by 22 days.

(21) Appl. No.: 09/818,472

(22) Filed: Mar. 27, 2001

(51) Int. Cl.[7] .......................... B29C 45/14; B29C 70/78
(52) U.S. Cl. ................... 264/250; 264/255; 264/266; 264/274
(58) Field of Search ........................ 264/250, 255, 264/259, 266, 271.1, 274, 275; 156/242, 245

(56) References Cited

U.S. PATENT DOCUMENTS

| | | | |
|---|---|---|---|
| 2,688,581 A | | 9/1954 | Stubbs |
| 2,931,110 A | | 4/1960 | Pietrocola |
| 3,279,048 A | | 10/1966 | Grove et al. |
| 3,522,345 A | | 7/1970 | Olsen |
| 4,188,888 A | | 2/1980 | Cooper et al. |
| 4,237,792 A | | 12/1980 | Somers |
| 4,281,070 A | * | 7/1981 | Scheetz et al. ............. 524/528 |
| 4,308,801 A | | 1/1982 | Cooper et al. |
| 4,333,404 A | | 6/1982 | Kleykamp |
| 4,351,530 A | * | 9/1982 | Bertozzi ..................... 473/119 |
| 4,390,214 A | | 6/1983 | Gunter et al. |
| 4,497,765 A | * | 2/1985 | Wilde et al. ................. 264/268 |
| 4,596,734 A | * | 6/1986 | Kramer ....................... 428/213 |
| 4,597,818 A | | 7/1986 | Aoyama et al. |
| 4,724,111 A | * | 2/1988 | Iwata et al. ................. 264/155 |
| 5,145,628 A | * | 9/1992 | Karg et al. ................... 264/248 |
| 5,292,584 A | * | 3/1994 | Howard et al. .............. 428/327 |
| 6,022,504 A | * | 2/2000 | Boaz et al. ................... 264/250 |
| 6,193,924 B1 | * | 2/2001 | Huse ............................ 264/503 |
| 6,224,809 B1 | * | 5/2001 | Orndorff, Jr. ................ 264/255 |

OTHER PUBLICATIONS

Brydson, J.A. "Chapter 10, Polyethylene, Plastics Materials," 6th Edition, Butterworth & Heinemann, 1995, pp. 201–239.
Wiley, John & Son, "Concise Encyclopedia of Polymer Science and Engineering," New York, 1990, pp. 349–357.
Wiley, John & Son, "Concise Encyclopedia of Polymer Science Engineering," New York, 1990, pp. 569–572.

* cited by examiner

Primary Examiner—Angela Ortiz
(74) Attorney, Agent, or Firm—Fredrikson & Byron, P.A.

(57) ABSTRACT

The present invention concerns a composite article having joined ultrahigh molecular weight polyethylene and melt-flowable polyethylene portions and method of making the same. The ultrahigh molecular weight polyethylene portion has a textured surface with a pattern of ribs which may vary in shape and configuration, such as a series of parallel ribs or a plurality of pins of various cross-sectional shapes, e.g., oval, round or rectangles. The melt-flowable polyethylene portion is melt-bonded to or fused to the ribs of the ultrahigh molecular weight polyethylene portion providing high bond strengths between the two portions. In the method of the invention, a ultrahigh molecular weight polyethylene portion having a rib surface is contacted with molten, melt-flowable polyethylene. The molten, melt-flowable polyethylene is at a sufficient temperature that the temperature of the ribs is raised quickly to a temperature enabling the melt-flowable polyethylene to strongly melt-bond to the ribbed surface.

10 Claims, 1 Drawing Sheet

METHOD OF FORMING COMPOSITE ULTRAHIGH MOLECULAR WEIGHT POLYETHYLENE MATERIAL

FIELD OF THE INVENTION

The present invention relates to composite articles of ultrahigh molecular weight polyethylene and melt-flowable polyethylene and a method of forming the same.

DESCRIPTION OF RELATED ART

Ultrahigh molecular weight polyethylene (UHMWPE) is a high density polyethylene with a molecular weight over $3 \times 10^6$. Chemically, high density polyethylene (HDPE) and UHMWPE are identical; both are straight-chain linear polymers. The molecular weight of conventional HDPE is rarely above 50,000; whereas, the molecular weight of UHMWPE is commonly above $3 \times 10^6$ and can be as high as $6 \times 10^6$.

Ultrahigh molecular weight polyethylene polymers are said to provide a level of abrasion resistance greater than that of any other thermoplastic and also to offer the highest impact toughness of any plastic. These polymers also offer good corrosion resistance and excellent environmental stress-crack resistance, and may be used in food processing situations. These polymers have also been used in bearing pads, prosthetics such as hip socket joints and artificial knees, and in other articles where the wear resistant properties of ultrahigh molecular weight polyethylene is desirable and advantageous.

In order to fasten bearing pads or other articles molded of UHMWPE to a supporting plate such as a fifth wheel or other rigid plate, screw fasteners are commonly used, as shown in U.S. Pat. No. 5,620,770. However, as bearing plates of this type become worn in use, the screws eventually become exposed and can damage the articles that bear against the pads. Efforts have been made to adhere ultrahigh molecular weight polyethylene pads to rigid plates, but this polymeric material is chemically rather inert and bonds to other materials, even HDPE and other polyolefins, only with difficulty. Adhesive bonds between UHMWPE and supporting plates of steel or the like may not be satisfactory when the bearing pads are to be used under circumstances in which the pads must withstand substantial compression, impact and shear forces.

Ultrahigh molecular weight polyethylene articles are difficult to form. Commonly, ultrahigh molecular weight polyethylene is molded in the form of plates or rods, and parts then are machined from these bulk shapes. This is due at least in part to the difficulty that has been experienced in the past in molding ultrahigh molecular weight polyethylene into intricate shapes and forms. Ultrahigh molecular weight polyethylene does not melt and flow well; it gets soft at or near the melting point of HDPE; that is, in the range of 125–130° C. Because of its resistance to melt and flow, it is difficult to mold large UHMWPE items or articles having intricate shapes and forms.

Melt-flowable polyethylenes having lower molecular weights, such as HDPE, low density polyethylene (LDPE), and linear low density polyethylene (LLDPE), melt and flow with relative ease by comparison and are more readily molded than UHMWPE. These lower molecular weight polyethylenes are generally characterized as having a unique combination of properties: toughness, high impact strength, low brittleness temperature, flexibility, processibility, chemical resistance, low permeability to water, stability, and outstanding electrical properties. Their low melting point and high chemical stability facilitates processing by conventional techniques, such as injection molding, blow molding, and extrusion.

It would be desirable to form a composite article having a UHMWPE portion for use as a bearing surface, as for snowmobile skis and the like on the one hand, coupled to a melt-flowable polyethylene portion capable of being molded into desired shapes on the other hand, the article being capable of being made by rapid injection molding techniques and providing a strong bond between the portions. Unfortunately, as pointed out above, whereas LLDPE, LDPE and HDPE all melt and flow well, thus enabling them to be formed and shaped while molten, UHMWPE does not melt and flow to any appreciable extent. It would also be desirable to form such composite articles without the disadvantages of prolonged processing times and high energy input required to form similar articles exclusively of ultrahigh molecular weight polyethylene.

SUMMARY OF THE INVENTION

The present invention is directed to a method of rapidly forming a composite article having joined ultrahigh molecular weight polyethylene and melt-flowable polyethylene portions. The UHMWPE portion has a surface that is textured with a pattern of ribs. The ribs may vary in shapes and configurations, such as a series of parallel ribs or a plurality of pins of various cross-sectional shapes, e.g., oval, round or rectangles. The ribbed surface of the UHMWPE portion is contacted with molten, melt-flowable polyethylene that melt-bonds or fuses to the ribs of the UHMWPE portion. Using the method of the invention, composite articles can be rapidly formed, as by injection molding. Further, the composite articles of the present invention can be formed without the high energy input and longer processing time heretofore required to form similar articles exclusively of UHMWPE.

In a preferred embodiment of the method of the invention, a UHMWPE portion having a ribbed surface is contacted with molten, melt-flowable polyethylene. The ribs, having thin, easily heated sections, are so configured and the molten, melt-flowable polyethylene is at a sufficient temperature that the temperature of the ribs is raised quickly to a temperature, enabling the polyethylene strongly to melt-bond to the ribbed surface.

In another embodiment, the present invention is directed to composite articles having joined ultrahigh molecular weight polyethylene and melt-flowable polyethylene portions having high bond strength between the portions. The ultrahigh molecular weight polyethylene portion of this composite article includes a surface having ribs extending outwardly from it, such surface and the surface of the ribs of the ultrahigh molecular weight polyethylene portion being melt-bonded to the melt-flowable polyethylene portion. These composite articles are formed using the method of the present invention.

As used herein, the terms "ultrahigh molecular weight polyethylene" and "UHMWPE" refer to polyethylene that flows only with great difficulty when heated and that has a molecular weight of about $3 \times 10^6$, whereas the term "melt-flowable polyethylene" refers to meltable polyethylenes of lower molecular weight than UHWMPE and includes high density polyethylene (HDPE), linear low density polyethylene (LLDPE), and low density polyethylene (LDPE).

The exact chemical and physical nature of the bond formed between the two portions of an article according to the invention has not been determined. Although we do not wish to be bound by any specific theory, it appears that the surfaces are fused or melt-bonded such that the molecules of the UHMWPE portion and those of the melt-flowable polyethylene portion are intermingled at and across the surfaces of the two portions. Thus as used herein, the terms "melt-bond" or "melt bonded" refer to and mean that the bond strength between the two portions is equal to or greater than the internal tensile strength of either portion.

DETAILED DESCRIPTION OF THE INVENTION

Figure 1:
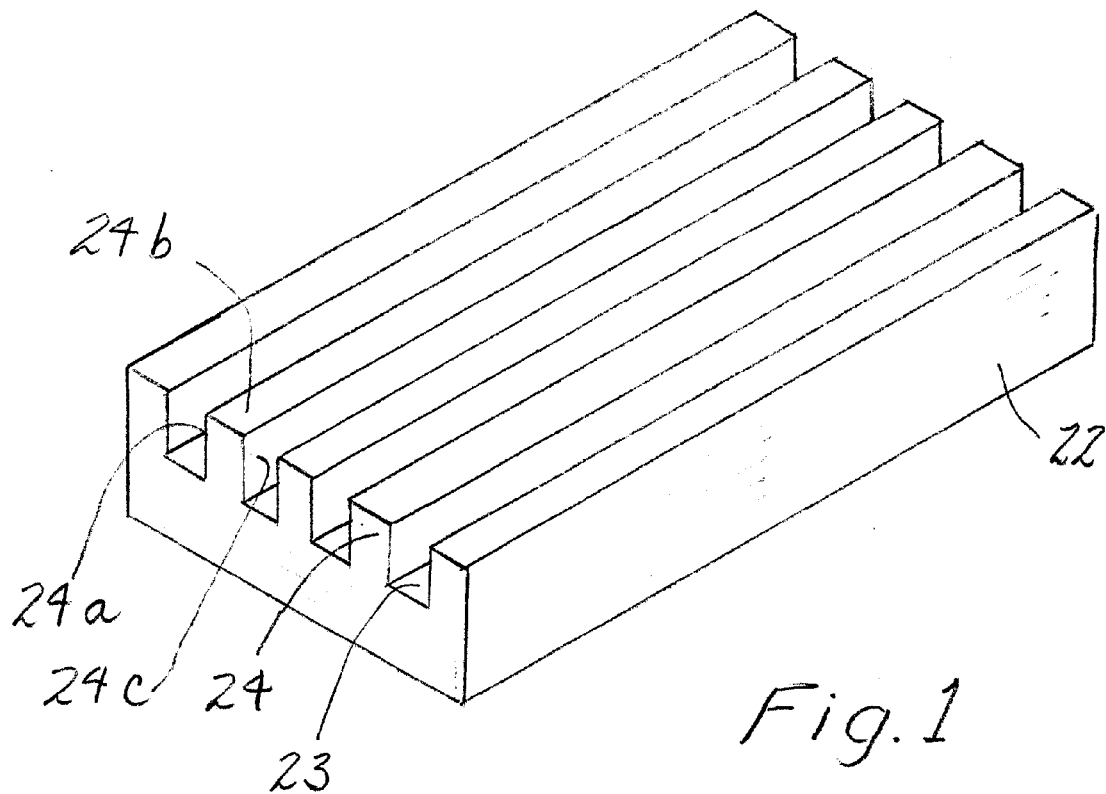
FIG. 1 is a perspective view of a UHMWPE portion of an article of the invention, having a ribbed surface.
Figure 2:
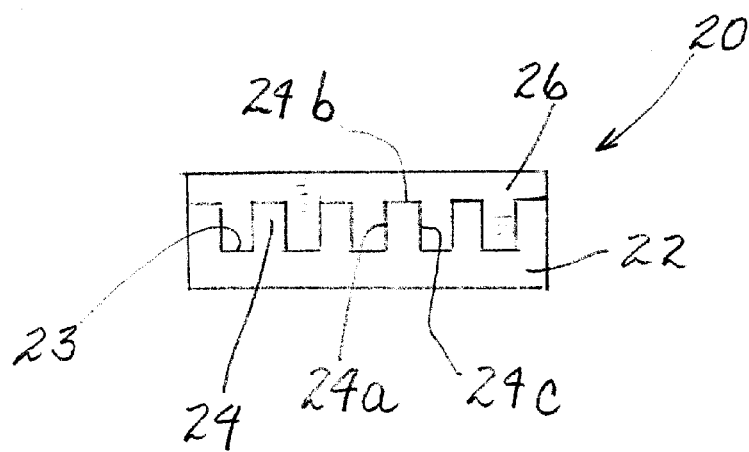
FIG. 2 is a front view of a composite article utilizing the UHMWPE portion of FIG. 1 and a melt-flowable polyethylene portion.

The composite article of ultrahigh molecular weight polyethylene and melt-flowable polyethylene 20 of FIG. 2 comprises an ultrahigh molecular weight polyethylene portion 22 and a melt-flowable polyethylene portion 26. The ultrahigh molecular weight polyethylene portion 22 of FIG. 1 has a surface 23 from which extends a plurality of ribs 24, the latter preferably extending normal to the surface 23. The ribs may be generally rectangular in cross-section, having sides 24a and 24c and top 24b. The composite article is rapidly formed, as by injection molding, by contacting the surface 23 and the surfaces 24A, 24B, and 24C of ribs 24 of the UHMWPE portion 22 with molten, melt-flowable polyethylene. The ribs must be sufficiently thin or otherwise of appropriate dimension and the polyethylene must be at a temperature sufficient to quickly raise the temperature of the ribs 24 sufficiently to allow the melt-flowable polyethylene to melt-bond to the ribbed surface of the ultrahigh molecular weight polyethylene portion.

The molten, melt-flowable polyethylene can be brought into contact with the ribbed surface using conventional molding techniques, such as injection molding or extrusion molding. Preferably, the molten, melt-flowable polyethylene is injection molded onto the ribbed surface.

The ribbed surface of the ultrahigh molecular weight polyethylene portion 22 can be formed during the molding of that portion, typically through compression molding. The ribbed surface may also be formed by machining operations. A discussion of machining techniques appears in the *Concise Encyclopedia of Polymer Science Engineering*, John Wiley & Son, New York, 1990, pages 569–572, which pages are incorporated herein by reference. Whether formed during molding or by machining, the ribs typically and desirably are parallel and extend outwardly from the surface of the UHMWPE part. This configuration facilitates machining. If desired, the ribs could be configured as a plurality of separate pins arising from the surface 23 and having round, oval, rectangular or other cross-sections.

The ribs 24 of FIG. 1 should be of a height and width and spaced apart sufficiently to allow molten, melt-flowable polyethylene that contacts the ribbed surface to raise the temperature of the ribs and enable the melt-flowable polyethylene to melt-bond to the ribbed surface. The height, width, and spacing of the ribs will depend to some extent upon the melt and fusion characteristics of the UHMWPE portion and the melt-flowable polyethylene portion. Good bonding between the portions has been achieved where the ribs have a height of 0.1 inches and a width of 0.06 inches and are uniformly spaced at a distance of 0.6 inches. The ribs preferably have a width not greater than about 0.2 inches, and the ratio of the average height of the ribs from the surface from which they extend to the thickness of the ribs preferably is at least about 1/1 and more preferably at least about 1.5/1, although the ratio can be substantially greater than this.

The method of the invention can be utilized to rapidly form a composite article of ultrahigh molecular weight polyethylene and melt-flowable polyethylene independent of the size and shape of the ultrahigh molecular weight polyethylene portion. Thus the ultrahigh molecular weight polyethylene portion could be a generally sheet-like article as shown on FIG. 1 for use as a bearing block or ski bottom, or could have a more complex structure as the need requires. Whether the ultrahigh molecular weight polyethylene portion is simple or complex, a melt-flowable polyethylene portion can be formed on the ribbed surface of the ultrahigh polyethylene portion by contacting the ribbed surface with molten, melt-flowable polyethylene. The ribs must be sufficiently thin or otherwise of appropriate dimension and the molten, melt-flowable polyethylene must be at a temperature sufficient to raise the temperature of the ribs, allowing the melt-flowable polyethylene to quickly melt-bond to the ribbed surface of the ultrahigh molecular weight polyethylene portion. For example, if the ribs are in the form of round pins, the minimum dimension of such pins measured parallel to surface 23 from which the pins arise would have to be such as to allow the molten, melt-flowable polyethylene to raise the temperature of the ribs and melt-bond thereto.

The ultrahigh molecular weight polyethylene polymers useful in the present invention can include additives, fillers and modifiers as desired such as colorants, curing agents, antioxidants, heat stabilizers, viscosity control agents, flame retardants, slip agents, blowing agents, cross linking agents, carbon black, anti-static additives, pigments, graphite fibers, powered metals and the like. Melt-flowable polyethylenes useful in the present invention can also include such additives. Melt-flowable polyethylenes useful in the invention include low density polyethylene, linear low density polyethylene and high density polyethylene. A discussion of these polyethylenes and ultrahigh molecular weight polyethylene appears in the *Concise Encyclopedia of Polymer Science and Engineering*, John Wiley & Son, New York, 1990, pages 349–357, which pages are incorporated by reference herein. Polyethylene properties are further discussed in *Chapter* 10 Polyethylene, Plastics Materials 6$^{th}$ Edition by J. A. Brydson, Butterworth & Heinemann, 1995, pages 201–239 which page are incorporated herein by reference.

Although various molding techniques could be used for joining the UHMWPE and melt-flowable polyethylene portions, this invention lends itself particularly to the injection molding process in which a UHMWPE portion of an article is received in a mold, this portion having already been provided with ribs that extend out into the interior of the mold. Molten, melt-flowable polyethylene is injected into the mold and immediately flows into contact with the ribs and fills the openings between the ribs, the melt-flowable polyethylene raising the temperature of the ribs sufficiently as to cause melt-bonding of the melt-flowable polyethylene to the ribs. Of importance, the ribs are sufficiently thin and offer a sufficient surface available for heat transfer as to heat up quickly when in contact with melt-flowable polyethylene. In comparison, if the molten polyethylene were simply flowed into contact with a non-ribbed surface of an article, such as the flat surface of a UHMWPE bearing block, a comparatively long time would be required for the temperature of that surface to be raised sufficiently as to bond strongly to the melt-flowable polyethylene.

While exemplary embodiments of this invention, and methods of practicing the same have been illustrated and described, it should be understood that various changes, adaptations and modifications may be made therein without departing from the spirit of the invention and the scope of the appended claims.

What is claimed is:

1. A method of rapidly forming a composite article of UHMWPE and melt-flowable polyethylene, comprising forming a UHMWPE portion having a ribbed surface, the ribbed surface having ribs having a ratio of average height to average thickness of at least 1.5/1 and extending outwardly from the UHMWPE portion, said ribs being configured of sufficient thickness and sufficiently spaced apart to allow molten, melt-flowable polyethylene applied to the ribbed surface to flow between the ribs and to cover the ribbed surface, and contacting the ribbed surface with molten, melt-flowable polyethylene injected into the mold, heated to a temperature sufficient to raise the temperature of such ribs, to enable the melt-flowable polyethylene to melt-bond to said ribbed surface.

2. The method of claim 1 in which said molten, melt-flowable polyethylene is injection molded onto said ribbed surface.

3. The method of claim 1 in which the ribbed surface is formed by machining the UHMWPE portion.

4. The method of claim one wherein said UHMWPE portion is compression molded to provide said ribbed surface.

5. The method of any one of claims 1–4 wherein said ribs have a width not greater than 0.2 inches.

6. The method of claim 1 in which said ribs are parallel.

7. The method of claim 1 in which the ratio of the average height of said ribs from the surface to the average thickness of said ribs is at least 1/1.

8. A method of rapidly forming a composite article having UHMWPE and melt-flowable polyethylene portions, comprising providing within an injection mold a UHMWPE portion having a ribbed surface, the ribbed surface having ribs having a ratio of average height to average thickness of at least 1.5/1 and extending outwardly from the UHMWPE portion, said ribs being configured of sufficient thickness and sufficiently spaced apart to allow molten, melt-flowable polyethylene applied to the ribbed surface to flow between the ribs and to cover the ribbed surface; and injecting molten, melt-flowable polyethylene into said mold and onto said ribbed surface at a temperature sufficient to raise the temperature of the ribs to enable the melt-flowable polyethylene to melt-bond to said ribbed surface.

9. The method of any one of claims 1, 2 and 8 wherein said UHMWPE portion is formed from UHMWPE containing useful additives.

10. The method of any one of claims 1, 2, and 8 wherein the melt-flowable polyethylene contains useful additives.

* * * * *